United States Patent
Paczkowski et al.

(10) Patent No.: US 9,021,585 B1
(45) Date of Patent: Apr. 28, 2015

(54) JTAG FUSE VULNERABILITY DETERMINATION AND PROTECTION USING A TRUSTED EXECUTION ENVIRONMENT

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 135 days.

(21) Appl. No.: 13/844,325

(22) Filed: Mar. 15, 2013

(51) Int. Cl.
*G06F 21/00* (2013.01)
*G06F 21/57* (2013.01)

(52) U.S. Cl.
CPC .................................. *G06F 21/577* (2013.01)

(58) Field of Classification Search
None
See application file for complete search history.

(56) References Cited

U.S. PATENT DOCUMENTS

| | | | |
|---|---|---|---|
| 5,303,378 A | 4/1994 | Cohen | |
| 5,796,952 A | 8/1998 | Davis et al. | |
| 6,131,024 A | 10/2000 | Boltz | |
| 6,219,712 B1 | 4/2001 | Mann et al. | |
| 6,477,180 B1 | 11/2002 | Aggarwal et al. | |
| 6,668,322 B1 | 12/2003 | Wood et al. | |
| 6,691,230 B1 | 2/2004 | Bardon | |
| 6,754,784 B1 * | 6/2004 | North et al. | 711/145 |
| 6,823,454 B1 | 11/2004 | Hind et al. | |
| 6,824,064 B2 | 11/2004 | Guthery et al. | |
| 6,895,234 B1 | 5/2005 | Laursen et al. | |
| 7,387,240 B2 | 6/2008 | Ziegler | |
| 7,552,467 B2 | 6/2009 | Lindsay | |
| 7,571,364 B2 * | 8/2009 | Whetsel | 714/726 |
| 7,650,645 B1 | 1/2010 | Langendorf et al. | |
| 7,873,837 B1 | 1/2011 | Lee et al. | |

(Continued)

FOREIGN PATENT DOCUMENTS

| | | |
|---|---|---|
| WO | WO2011025433 A1 | 3/2011 |
| WO | 2013170228 A2 | 11/2013 |

(Continued)

OTHER PUBLICATIONS

Clark, CJ. Anti-tamper JTAG TAP design enables DRM to JTAG registers and P1687 on-chip instruments. 2010 IEEE International Symposium on Hardware-Oriented Security and Trust (HOST). Pub. Date: 2010. Relevant pp. 19-24. http://ieeexplore.ieee.org/stamp/stamp.jsp?tp=&arnumber=5513119.*

(Continued)

*Primary Examiner* — Dede Zecher
*Assistant Examiner* — Jeremiah Avery

(57) ABSTRACT

A method of configuring a trusted security zone into a portable electronic device. The method comprises executing instructions on a processor of the portable electronic device that determine the state of a JTAG (JTAG) port of the portable electronic device, if the JTAG port is determined to be enabled, executing instructions on the processor preventing configuration of the trusted security zone into the portable electronic device, and if the JTAG port is determined to be disabled, configuring the trusted security zone into the portable electronic device, whereby a vulnerability to hacking the trusted security zone via an enabled JTAG port is reduced.

15 Claims, 7 Drawing Sheets

(56) References Cited

U.S. PATENT DOCUMENTS

| | | |
|---|---|---|
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,631,247 B2 * | 1/2014 | O'Loughlin et al. ......... 713/189 |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,831,998 B1 | 9/2014 | Cramer et al. |
| 8,839,460 B2 * | 9/2014 | Shirlen et al. ................ 726/34 |
| 8,850,568 B2 * | 9/2014 | Shirlen et al. ................ 726/22 |
| 8,856,600 B2 * | 10/2014 | Zadigian et al. ............. 714/724 |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,954,588 B1 | 2/2015 | Bertz et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Ringborg et al. |
| 2005/0015601 A1 | 1/2005 | Tabi |
| 2005/0052994 A1 | 3/2005 | Lee |
| 2005/0091505 A1 | 4/2005 | Riley et al. |
| 2005/0138433 A1 | 6/2005 | Linetsky |
| 2005/0235166 A1 | 10/2005 | England et al. |
| 2005/0239481 A1 | 10/2005 | Seligmann |
| 2005/0289355 A1 * | 12/2005 | Kitariev et al. ................ 713/182 |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0156026 A1 | 7/2006 | Utin |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0118880 A1 | 5/2007 | Mauro, II |
| 2007/0143210 A1 | 6/2007 | Yeung et al. |
| 2007/0162759 A1 * | 7/2007 | Buskey et al. ................ 713/182 |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1 | 1/2008 | Brown et al. |
| 2008/0092213 A1 | 4/2008 | Wei et al. |
| 2008/0097793 A1 | 4/2008 | Dicks et al. |
| 2008/0121687 A1 | 5/2008 | Buhot |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0182634 A1 | 7/2009 | Park et al. |
| 2009/0193491 A1 | 7/2009 | Rao |
| 2009/0271321 A1 | 10/2009 | Stafford |
| 2009/0281947 A1 | 11/2009 | Erel |
| 2009/0300599 A1 | 12/2009 | Piotrowski |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 * | 1/2011 | Smith et al. ................... 718/102 |
| 2011/0014948 A1 | 1/2011 | Yeh |
| 2011/0021175 A1 | 1/2011 | Florek et al. |

(56) References Cited

U.S. PATENT DOCUMENTS

| | | |
|---|---|---|
| 2011/0035604 A1 | 2/2011 | Habraken |
| 2011/0055084 A1 | 3/2011 | Singh |
| 2011/0078081 A1 | 3/2011 | Pirzadeh et al. |
| 2011/0082711 A1 | 4/2011 | Poeze et al. |
| 2011/0112968 A1 | 5/2011 | Floreck et al. |
| 2011/0113479 A1 | 5/2011 | Ganem |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0258462 A1* | 10/2011 | Robertson et al. ............. 713/193 |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2013/0014259 A1 | 1/2013 | Gribble et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0086385 A1* | 4/2013 | Poeluev ........................ 713/176 |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159186 A1 | 6/2013 | Burdnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0191632 A1 | 7/2013 | Spector et al. |
| 2013/0212704 A1 | 8/2013 | Shablygin et al. |
| 2013/0262264 A1 | 10/2013 | Karstoft |
| 2013/0263212 A1 | 10/2013 | Faltyn et al. |
| 2013/0305333 A1 | 11/2013 | Katzer et al. |
| 2013/0332456 A1 | 12/2013 | Arkin |
| 2013/0343181 A1* | 12/2013 | Stroud et al. ................... 370/229 |
| 2013/0345530 A1 | 12/2013 | McRoberts et al. |
| 2013/0347103 A1* | 12/2013 | Veteikis et al. ................. 726/22 |
| 2014/0033316 A1 | 1/2014 | Paczkowski et al. |
| 2014/0047548 A1 | 2/2014 | Bye et al. |
| 2014/0074508 A1 | 3/2014 | Ying et al. |
| 2014/0155025 A1 | 6/2014 | Parker et al. |
| 2014/0188738 A1 | 7/2014 | Huxham |
| 2014/0245444 A1 | 8/2014 | Lutas et al. |
| 2014/0254381 A1 | 9/2014 | Racz et al. |
| 2014/0279558 A1 | 9/2014 | Kadi et al. |
| 2014/0281544 A1 | 9/2014 | Paczkowski et al. |

FOREIGN PATENT DOCUMENTS

| | | |
|---|---|---|
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Lee, Jeremy; Tehranipoor, Mohammad; Plusquellic, Jim. A Low-Cost Solution for Protecting IPs Against Scan-Based Side-Channel Attacks. 24th IEEE VLSI Test Symposium. Pub. Date: 2006. http://ieeexplore.ieee.org/stamp/stamp.jsp?tp=&arnumber=1617569.*

Vakulya, Gergely; Simon, Gyula. Design of a Sensor Network Based Security System. 2011 IEEE 7th International Symposium on Intelligent Signal Processing (WISP). Pub. Date: 2011. Relevant pp. 1-5. http://ieeexplore.ieee.org/stamp/stamp.jsp?tp=&arnumber=6051721.*

FAIPP Pre-Interview Communication dated Oct. 24, 2012, U.S. Appl. No. 13/463,797, filed May 3, 2012.

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

FAIPP Pre-Interview Communication dated Jun. 6, 2013, U.S. Appl. No. 13/571,348, filed Aug. 10, 2012.

FAIPP Pre-Interview Communication dated Jun. 5, 2013, U.S. Appl. No. 13/556,200, filed Jul. 24, 2012.

(56) References Cited

OTHER PUBLICATIONS

First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
Notice of Allowance dated Nov. 29, 2013, U.S. Appl. No. 13/440,980, filed Apr. 5, 2012.
Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.

(56) References Cited

OTHER PUBLICATIONS

Foreign Communication from a Related Counterpart—International Search Report and Written Opinion, dated Feb. 4, 2014, PCT/US13/51750, filed on Jul. 24, 2013.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Notice of Allowance dated May 27, 2014, U.S. Appl. No. 13/482,731, filed May 29, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed on Aug. 5, 2013.
Advisory Action dated Jun. 23, 2014, U.S. Appl. No. 13/571,348, filed Aug. 10, 2012.
Notice of Allowance dated Jun. 4, 2014, U.S. Appl. No. 13/557,213, filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
Foreign Communication from a Related Counterpart—International Preliminary Report on Patentability, dated Nov. 20, 2014, PCT/US13/40673, filed May 10, 2013.
Perrig, Adrian, et al., "SPINS: Security Protocols for Sensor Networks," ACM, Sep. 2002, vol. 8, pp. 521-534.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.

(56) References Cited

OTHER PUBLICATIONS

Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.

\* cited by examiner

JTAG FUSE VULNERABILITY DETERMINATION AND PROTECTION USING A TRUSTED EXECUTION ENVIRONMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network capable electronic devices are becoming increasingly prevalent in our daily lives. Additionally, more and more electronic devices that did not have network capabilities are getting network capable. With the rapid development and popularization of network capable electronic devices, a wide variety of increasingly sophisticated techniques are being deployed by attackers to take control of electronic devices and obtain confidential information, for example personal and payment data. The development of online application stores also helps cause rapid development, distribution and proliferation of malware applications across the network. The behavior of uncontrollable electronic device or leak of confidential user information and their impact on the user experience may have implications for user satisfaction with the electronic device and/or the network service provider.

SUMMARY

In an embodiment, a method of configuring a trusted security zone into a portable electronic device is disclosed. The method comprises executing instructions on a processor of the portable electronic device that determine the state of a JTAG (JTAG) port of the portable electronic device, if the JTAG port is determined to be enabled, executing instructions on the processor preventing configuration of the trusted security zone into the portable electronic device, and if the JTAG port is determined to be disabled, configuring the trusted security zone into the portable electronic device, wherein the trusted security zone provides hardware assisted trust, whereby a vulnerability to hacking the trusted security zone via an enabled JTAG port is reduced.

In an embodiment, a method of protecting an electronic device from a hacking attack that exploits a JTAG (JTAG) port of the electronic device that has not been disabled is disclosed. The method comprises executing instructions on a processor of the electronic device that determine the state of a JTAG port of the electronic device, if the JTAG port is determined to be enabled, executing instructions on the processor of the electronic device to detect a physical connection to the JTAG port, if a physical connection to the JTAG port is detected, executing instructions on the processor preventing execution of trusted applications, and if the JTAG port is determined to be enabled, executing instructions on the processor preventing execution of software that reads from the JTAG port, whereby a vulnerability of the electronic device to a hacking attack that exploits an enabled JTAG port is reduced.

In an embodiment, a method of thwarting a hacking attack on a mobile phone via an enabled JTAG (JTAG) port of the mobile phone is disclosed. The method comprises executing instructions on a processor of the mobile phone that detect the state of the JTAG port as one of enabled or disabled and when the JTAG port is determined to be enabled, taking a first action to reduce vulnerability to hacking attacks via the enabled JTAG port.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
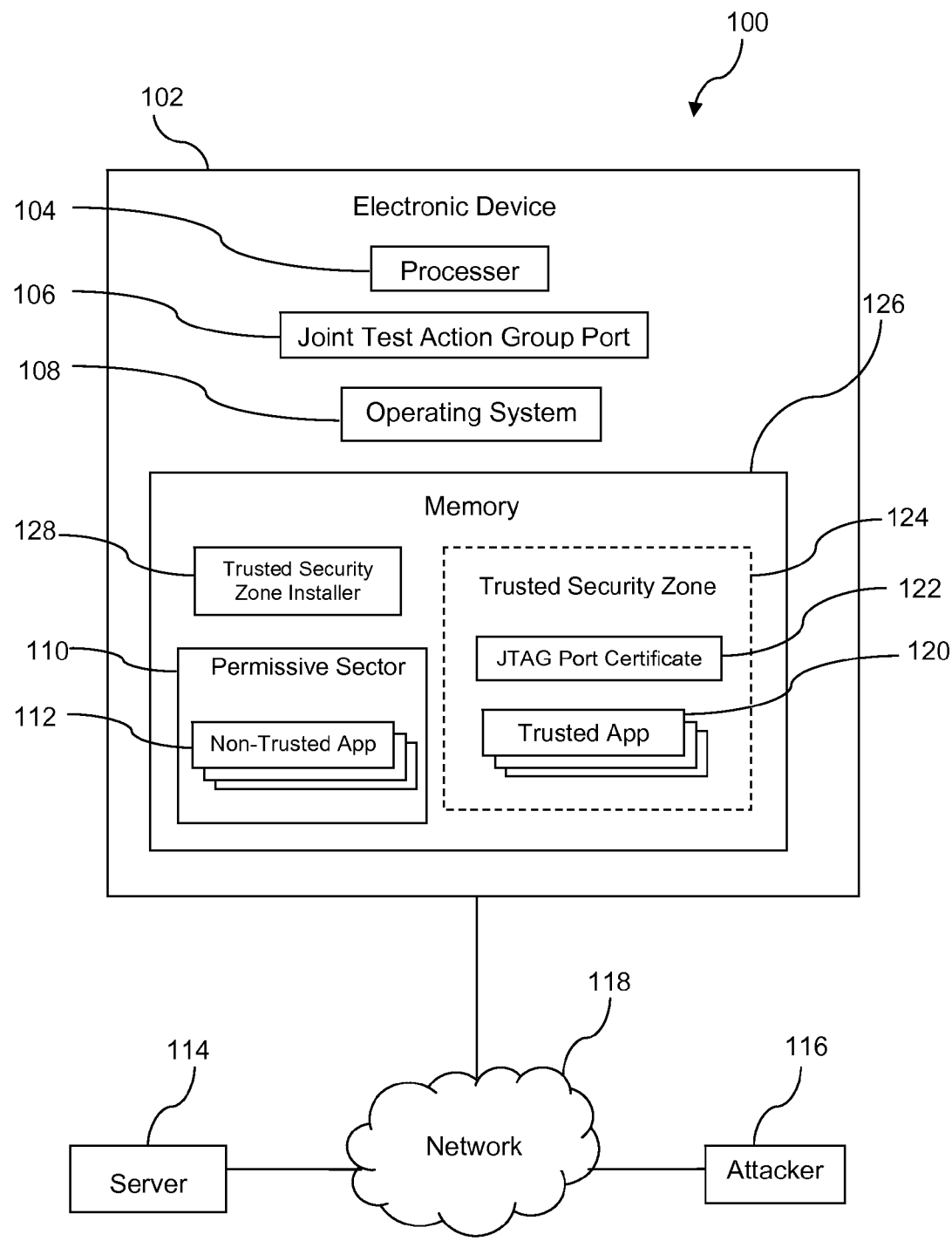
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused by electronic devices that interfere with the proper operation of electronic devices or the coupled networks—for example the ability of electronic devices to transmit or receive confidential information. The problems may result from malware that infected the electronic devices through the coupled network. For example, malware that infect an electronic device via Internet may try to control the electronic device or steal personal or payment information from the electronic device. "Backdoor" malware that infected an electronic device may give attackers full access via joint test action group (JTAG) ports to users' devices. Because device manufacturers may leave JTAG ports enabled intentionally or accidentally, there is little the service provider or user can do to assure the reliability of the electronic devices with enabled JTAG ports. The present disclosure teaches a method for proactively examining the status of a JTAG port of an electronic device and taking further action to assure the reliability of the electronic device under different circumstances.

For example, instructions may be executed by the processor of an electronic device to determine the status of a JTAG port of the electronic device and take corresponding proactive action. When the JTAG port is determined to be disabled, a trusted security zone is also configured into the electronic device. A JTAG port inspected certificate is also generated for the electronic device with the disabled JTAG port. Furthermore, the JTAG port inspected certificate is stored into secure memory in the trusted security zone of the electronic device. When the JTAG port is determined to be enabled, a trusted security zone is prevented from configuring into the electronic device. Software that reads from the JTAG port is prevented from executing on the electronic device with an enabled JTAG port. If a physical connection is detected to the JTAG port after the JTAG port is determined to be enabled, execution of trusted applications on the electronic device will be prevented. In an embodiment, one or more untrusted applications may be prevented from executing on the electronic device after the JTAG port is determined to be enabled.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the system 100 comprises a plurality of electronic devices 102. The electronic device 102 may comprise one or more processors 104, one or more JTAG (JTAG) ports 106, an operating system 108, and a memory 126. In an embodiment, the device 102 may have access to a network 118. A server computer 114 is coupled to the network 118, for example a server 114 operated by a network service provider. The network 118 may also be accessible to an attacker computer 116. The network 118 may comprise any combination of private and public networks.

It is understood that the system 100 may comprise any number of servers 114 and any number of attackers 116. The electronic device 102 and attacker 116 may be any of a computer, a tablet computer, a mobile phone, a personal digital assistant (PDA), a media player, a game console, an Internet digital media streaming device, or another network/communications capable device. Computers are discussed in more detail hereinafter. The electronic device 102 and the attacker 116 may access the network 118 through wired or wireless access network. The wired access network may be abstracted in different ways and may comprise cable modems and Ethernet routers, switches, or hubs. The wireless access network may also be abstracted in different ways and may comprise wireless access points, cable modems, Ethernet or wireless routers, switches, or hubs, servers and data storages such as home location registers (HLRs) or servers that implement the functionality of home location registers, visitor location registers (VLRs) or servers that implement the functionality of visitor location registers, base transceiver stations, base station controllers (BSCs), mobile switching centers (MSCs), and other network nodes that are specifically associated with providing wireless access and connectivity to the electronic devices.

Non-trusted applications 112 are normal applications in the electronic device 102. When trusted applications 120 are executed in the trusted security zone 124 of the electronic device 102, peripherals and data of the electronic device 102 may not be accessible to the non-trusted applications 112. The non-trusted applications 112 are stored in a permissive sector 110 in the memory 126. The permissive sector 110 of the memory 126 is the normal partition in the memory 126. Normal applications, the non-trusted applications 112, may be stored in the permissive sector 110 in the memory 126. Additionally, non-secure resources may be stored in the permissive sector 110 in the memory 126.

Trusted applications 120 are authorized secure applications that may store, transmit, or receive confidential data. The trusted applications 120 may execute using higher level of security than the non-trusted applications 112 that are executed in the operating system 108. For example, the trusted applications 120 may be applications used to perform payments, online banking, and enterprise authentication. The trusted applications 120 may also be applications that entail content protection such as email and corporate VPN. The trusted applications 120 may be applications that handle confidential health records or personal health metrics. Additionally, the trusted applications 120 may be entertainment content streaming services that entail content protection of the data in the form of music and video as well as authentication of the device 102 or the user, or another application that stores, transmits or receives confidential data. The trusted applications 120 may be stored at least in part in the secure partition of the memory 126, the trusted security zone 124. The trusted applications 120 may be built in by device makers, original equipment manufacturer (OEM), or installed as users demand them. The trusted applications 120 can originate from different application providers. The trusted applications 120 running in a trusted execution environment may have access to the full power of a device's main processor and memory when the trusted applications 120 are executed with hardware isolation that protects the trusted applications 120 from user installed applications in the main operating system. Software and cryptographic isolation inside the trusted execution environment protect the trusted applications 120 from each other. Hence, an unauthorized trusted application 120 may not have the access to the security resources of another trusted application 120.

In an embodiment, the trusted security zone 124 is more than just a segment of memory. The trusted security zone 124 may also have a dimension of processing. The trusted security zone 124 may provide the secure execution environment for trusted applications 120 where only trusted applications 120 may operate, safe from attacks. The trusted security zone 124 may be implemented by partitioning both hardware and software resources of the electronic device 102 into two partitions: a secure partition and a normal partition. The secure partition may be implemented by a distinct, separate, or dedicated physical processor, usually the first processor, from the processor by which the normal partition may be implemented, usually the second processor. Alternatively, the secure partition may be implemented by a distinct, separate, or dedicated virtual processor from the virtual processor by which the normal partition may be implemented.

JTAG ports 106 may be used for software debugging for an embedded system, firmware storing/updating for an embedded system, boundary scan testing for printed circuit boards, or other relevant purposes at the manufacturer of a device. When a JTAG port is not disabled after manufacturing, the fundamental cycle/chip level processing state of a device may still be accessed. For example, with a single Chinese character as a password, the fundamental cycle/chip level processing state of a device may be accessed. Additionally, the device may be reprogrammed at the chip level via the JTAG port. Hence, the enabled JTAG port may be utilized as backdoor access that can give attackers full access to a device to harm a device, collect confidential data from the device, or for another unauthorized use. The JTAG ports 106 may be disabled at the manufacturer when the manufacturing and testing process is finished to prevent them from being utilized by attackers for unauthorized uses. However, the device vender/original equipment manufacturer may leave the JTAG ports 106 enabled by oversight or deliberately. If the device vender/original equipment manufacturer fails to disable a JTAG port 106, there may still be physical, digital, or logical connection to the JTAG port 106 and the JTAG port 106 is still alive. The test port, test wire, test connection, or test voltage of the JTAG port 106 may still be utilized to go to the base of the processor/chip.

In an embodiment, the trusted security zone 124 functions as a test monitor and decides whether an electronic device 102 may be trusted. Usually, actual pins are applied to check poles, functionality, or voltages of the JTAG ports 106 to determine whether the JTAG ports 106 are disabled. However, applying actual pins to test the voltages of the JTAG ports 106 after the chip is assembled/integrated into a circuit board/an electronic device and shipped to the service provider may not be feasible and the process may be emulated with an application in the trusted execution environment or the trusted security zone installer program 128 that tries to enable trust. The trusted security zone installer 128 may go to the right channels/ports/pins of the hardware to check the voltage of the JTAG port 106, channel, or pin, for example whether the voltage is zero or one. For example, when the JTAG fuse is enabled, the input impedance of the corresponding channel/port/pin may be lowered, which may affect the voltage reference measurement.

For example, the application in the trusted execution environment or the trusted security zone installer 128 may examine the status of the JTAG ports 106 and take action to reduce the risk that the electronic device 102 may be attacked by unauthorized parties. In an embodiment, when the JTAG ports 106 are determined to be disabled, the trusted security zone installer 128 configures the trusted security zone into the electronic device 102. When the JTAG ports 106 are determined to be disabled, the trusted security zone installer 128 may also generate a JTAG port inspected certificate 122 for the electronic device 102. Note that the existence of the JTAG port inspected certificate 122 indicates or implies a specific sequence of actions: the JTAG port 106 was checked and determined to be disabled first; after the JTAG port 106 was checked and found to be disabled, then the trusted security zone 124 was installed second; and only after the trusted security zone 124 was installed was the JTAG port inspected certificate 122 built.

When the JTAG ports 106 are determined to be enabled, the trusted security zone installer 128 may send a message to a server computer identifying the electronic device 102 as one with the enabled JTAG ports 106. When the JTAG ports 106 are determined to be enabled, the trusted security zone installer 128 may prevent configuration of the trusted security zone 124 into the electronic device 102. The trusted security zone installer 128 may also prevent trusted applications 120 from executing or other applications that attempts to access resources of a higher security level.

At the time of verifying and building up trust before installing the trusted security zone, for example at the service provider side, the trusted security zone installer 128 may be executed behind the trusted execution environment by the processor 104 to test the status of the JTAG (JTAG) ports 106.

For example, the determination of the status of the JTAG (JTAG) ports 106 is helpful before installation of software that requires higher security level than non-trusted applications 112 in the main operating system 108. In an embodiment, it is determined whether the JTAG port 106 is disabled or enabled after testing the status of the JTAG port 106. The JTAG ports 106 may be tested by testing whether the fuses of JTAG ports 106 are blown. The determination of the state of the JTAG ports 106 may be carried by reading from the JTAG port 106 addresses.

If the JTAG port 106 on the electronic device 102 is determined to be disabled, the trusted security zone installer 128 may take certain further action. For example, a trusted security zone 124 may be configured into the electronic device 102. In an embodiment, the trusted security zone 124 provides hardware assisted trust/security. Additionally, a JTAG port inspected certificate 122 may be generated for the device 102. The trusted execution environment may be included/integrated within an application processor 104 on the electronic device 102. In an embodiment, the execution environment comprises the trusted security zone 124. In an embodiment, the trusted security zone 124 may be configured or not be configured at all at the service provider after the electronic device 102 is shipped from the device maker/assembler. When the trusted security zone 124 is configured after the JTAG ports 106 are determined to be disabled, the trusted security zone 124 may be installed in a secure portion of the memory 126 in the electronic device 102. The JTAG port inspected certificate 122 or existence of the trusted security zone 124 may be taken as an indicator for the fact that the device 102 is stable, reliable, or trustworthy, for example by potential trusted applications 120. The JTAG port inspected certificate 122 may be stored into a trusted memory area of the trusted security zone 124. Additionally/alternatively, a parameter value may be stored abstractly indicating that the JTAG port 106 is disabled. The parameter may be stored in a trusted memory area of the secure partition of the memory 126, the trusted security zone 124.

On the other hand, if the JTAG port 106 is determined to be enabled, the trusted security zone installer 128 executed on the processor 104 may take precautionary or remediating action. A message may be sent to the server computer 114 identifying the electronic device 102 and indicating that the JTAG ports 106 of the electronic device 102 were determined to be enabled. The message sent to the server computer 114 may be an electronic message via the network 118. Downloading of confidential information to the electronic device 102 may be prevented by instructions executed on the processor 104 of the electronic device 102. For example, downloading of a credit card number or a credit card payment application may be prevented. Additionally, downloading of financial applications to the electronic device 102 may be prevented.

Traditionally, JTAG fuses need to be blown to be disabled and so attackers or others would not have access to the memory 126 via the JTAG ports 106 or to the very fundamental core of the processor 104 via the JTAG ports 106. In an embodiment, the trusted security zone installer 128 may provide hardware assisted trust/security without blowing the JTAG fuses. For example, the trusted security zone installer 128 may be executed on the processor 104 to stop initializing trusted security zone 124 configuration and prevent any future action that tries to start the trusted security zone 124 configuration again. The trusted security zone installer 128 may be executed on the processor 104 preventing configuration of the trusted security zone 124 into the electronic device 102 if the initialization of the trusted security zone 124 has not begun.

A hardware portion of the electronic device 102 intended for installation of a trusted security zone 124 may be marked as invalid or untrusted. For example, the hardware portion of the electronic device 102 intended for installation of a trusted security zone 124 may not be used for any purpose or only for non-trusted applications 112 or information that does not entail higher security level. Additionally, instructions may be executed on the processor 104 preventing execution of software that reads from the JTAG port 106. For example, throughout the lifetime of the electronic device 102, the trusted security zone installer 128 may monitor and/or discipline the executables/programs that are loaded on the JTAG ports 106 and may inhibit, pause, and/or shut down the executables/programs that read from the JTAG ports 106.

The trusted security zone installer 128 may also detect when a program is trying to modify any JTAG port 106 in an over-the-air fashion and may inhibit, pause, and/or shut down the corresponding program. In an embodiment, an untrusted logo may be displayed on a display of the electronic device 102 when the JTAG port 106 is determined to be enabled. For example, an untrusted logo may be displayed when the electronic device 102 is turned on.

The trusted security zone installer 128 may be executed on the processor 104 to detect a physical connection to the JTAG port 106. If a physical connection to the JTAG port 106 is detected, the trusted security zone installer 128 may be executed on the processor 104 preventing execution of trusted applications 120.

Figure 2:
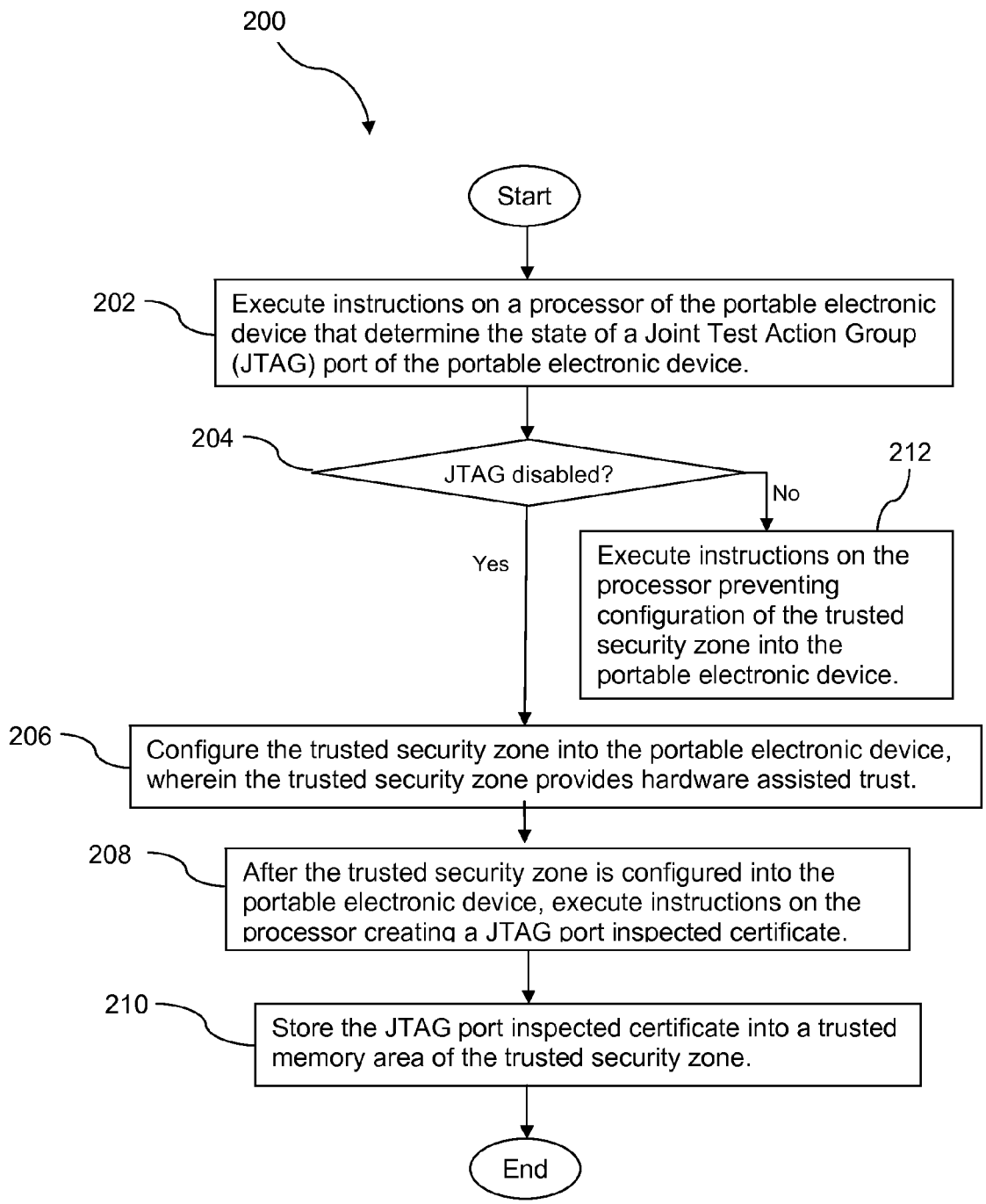
FIG. 2 is a flow chart illustrating a method according to an embodiment of the disclosure.

Turning now to FIG. 2, a method 200 is described. At block 202, instructions are executed on a processor 104 of the portable electronic device 102 that determines the state of a JTAG port 106 of the portable electronic device 102. For example, instructions are executed on the processor 104 to determine whether the JTAG port 106 is disabled. For example, the determination process of the status of the JTAG port 106 may comprise the determination of whether the fuses of the JTAG ports 106 are blown. The determination process of the status of the JTAG port 106 may further comprise reading from the JTAG port 106 addresses.

If the JTAG port is not disabled, the method 200 proceeds to block 212. If the JTAG port is disabled, the method 200 proceeds to block 206. At block 212, instructions are executed on the processor 104 preventing configuration of the trusted security zone 124 into the portable electronic device 102. When the JTAG port 106 is enabled, the electronic device is considered as unstable, unreliable, or untrustworthy, and so the trusted security zone may not be configured into the electronic device 102. At block 206, the trusted security zone 124 is configured into the portable electronic device 102, wherein the trusted security zone 124 provides hardware assisted trust or root of trust. At block 208, after the trusted security zone is configured into the portable electronic device, instructions are executed on the processor 104 creating a JTAG port inspected certificate 122. The existence of the JTAG port inspected certificate 122 indicates or implies that the JTAG port 106 was checked, determined to be disabled, and the trusted security zone 124 was installed. With the JTAG port inspected certificate 122, the electronic device 102 may be taken as stable, reliable, or trustworthy, for example by potential trusted applications 120. With the JTAG port inspected certificate 122, the electronic device 102 may be taken as stable, reliable, or trustworthy by confidential information that requires higher security level than normal information processed in the operating system 108 or stored in the permissive sector of the memory 126. Additionally, the JTAG inspected certificate 122 may be stored—off device—for future use in demonstrating integrity of device trust—as when a claim for unauthorized disclosure of confidential information or hacking the device 102 is advanced. At block 210, the JTAG port inspected certificate 122 is stored into a trusted memory area of the trusted security zone 124. The JTAG port inspected certificate 122 may not be accessible with unauthorized attempts by the non-trusted applications 112, which may assure the JTAG port inspected certificate 122 as a trustworthy indicator for the credibility of the electronic device.

Figure 3:
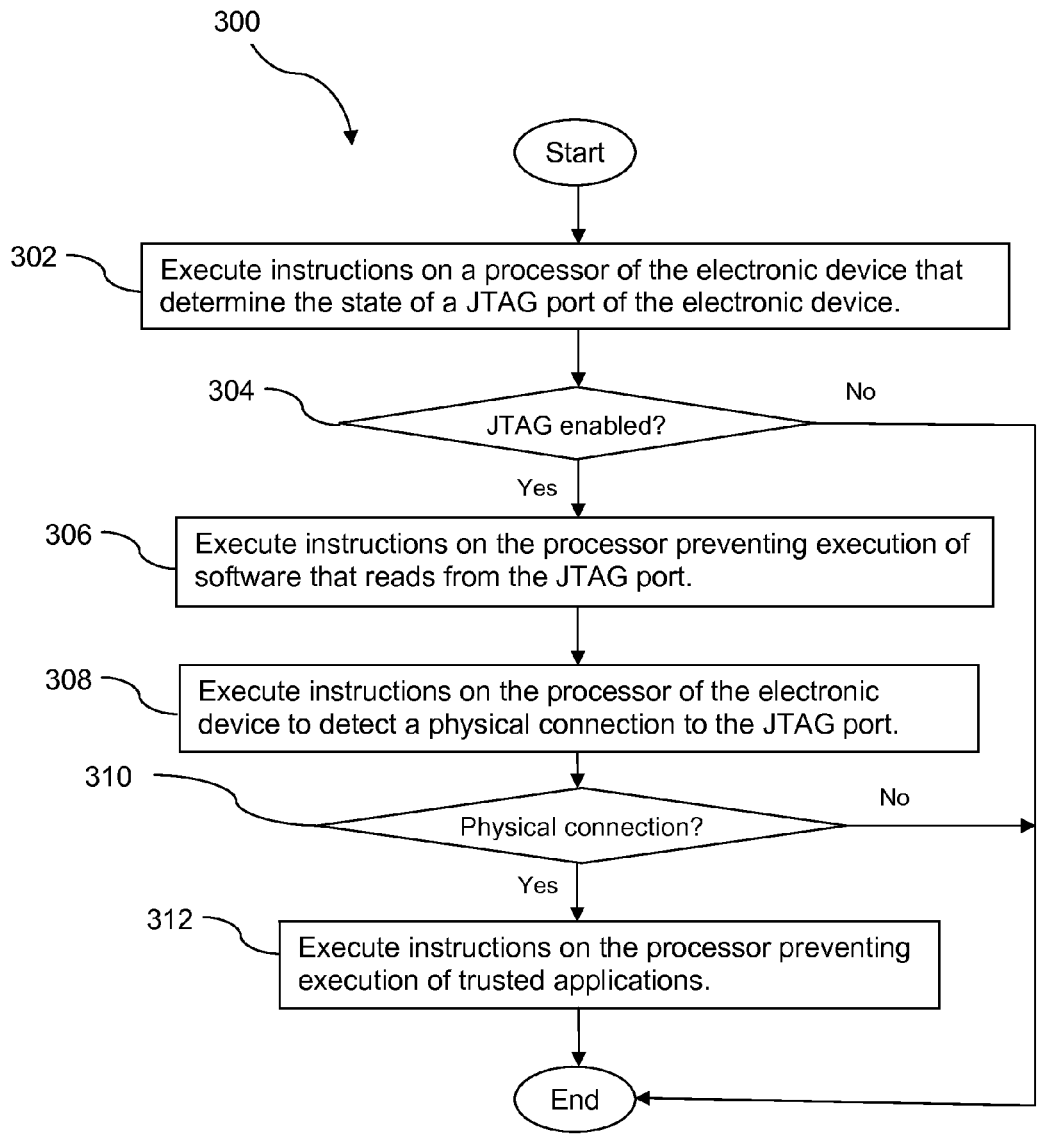
FIG. 3 is a flow chart illustrating another method according to an embodiment of the disclosure.

Turning now to FIG. 3, a method 300 is described. At block 302, instructions are executed on a processor 104 of the electronic device 102 that determine the state of a JTAG port 106 of the electronic device 102. At block 304, it is determined whether the JTAG port 106 is enabled. If the result of block 304 is false, which means the JTAG port 106 is disabled, end the program. If the result of block 304 is true, which means the JTAG port 106 is enabled, block 306 is executed and instructions are executed on the processor 104 preventing execution of software that reads from the JTAG port 106. When the JTAG port 106 is enabled, the electronic device 102 is considered to be unreliable and the electronic device 102 may be vulnerable to attackers 116 via the JTAG port 106. The JTAG port 106 may be exploited by attackers to access the memory 126 and reprogram the electronic device 102. Thus block 306 is helpful when the JTAG port 106 has been left enabled. At block 308, instructions are executed on the processor 104 of the electronic device 102 to detect a physical connection to the JTAG port 106. The possible ways that the JTAG port 106 is enabled comprise digital, physical, or logical connection to the JTAG port 106. Here instructions are executed to detect specifically physical connection. At block 310, it is determined whether a physical connection to the JTAG port 106 is detected. If the result of block 310 is false, which means no physical connection to the JTAG port 106 is detected, end the program. If the result of block 310 is true, which means a physical connection to the JTAG port 106 is detected, block 312 is executed. At block 312, instructions are executed on the processor 104 preventing execution of trusted applications 120. Trusted applications 120 entail higher security level, but the electronic device 102 may not be reliable when the JTAG port 106 is enabled. Hence, the trusted applications may not be allowed to be executed on the electronic device 102.

Figure 4:
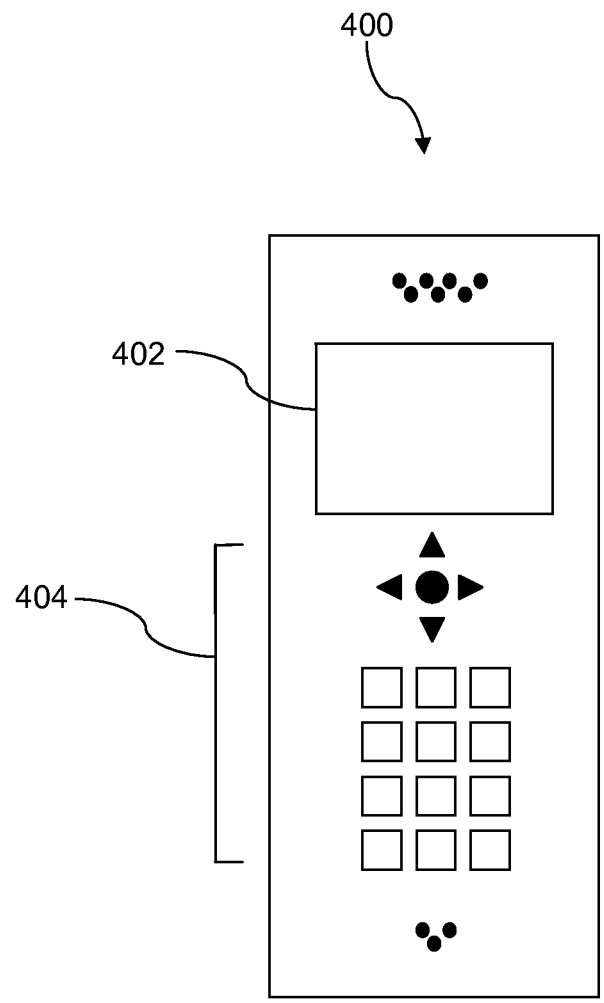
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
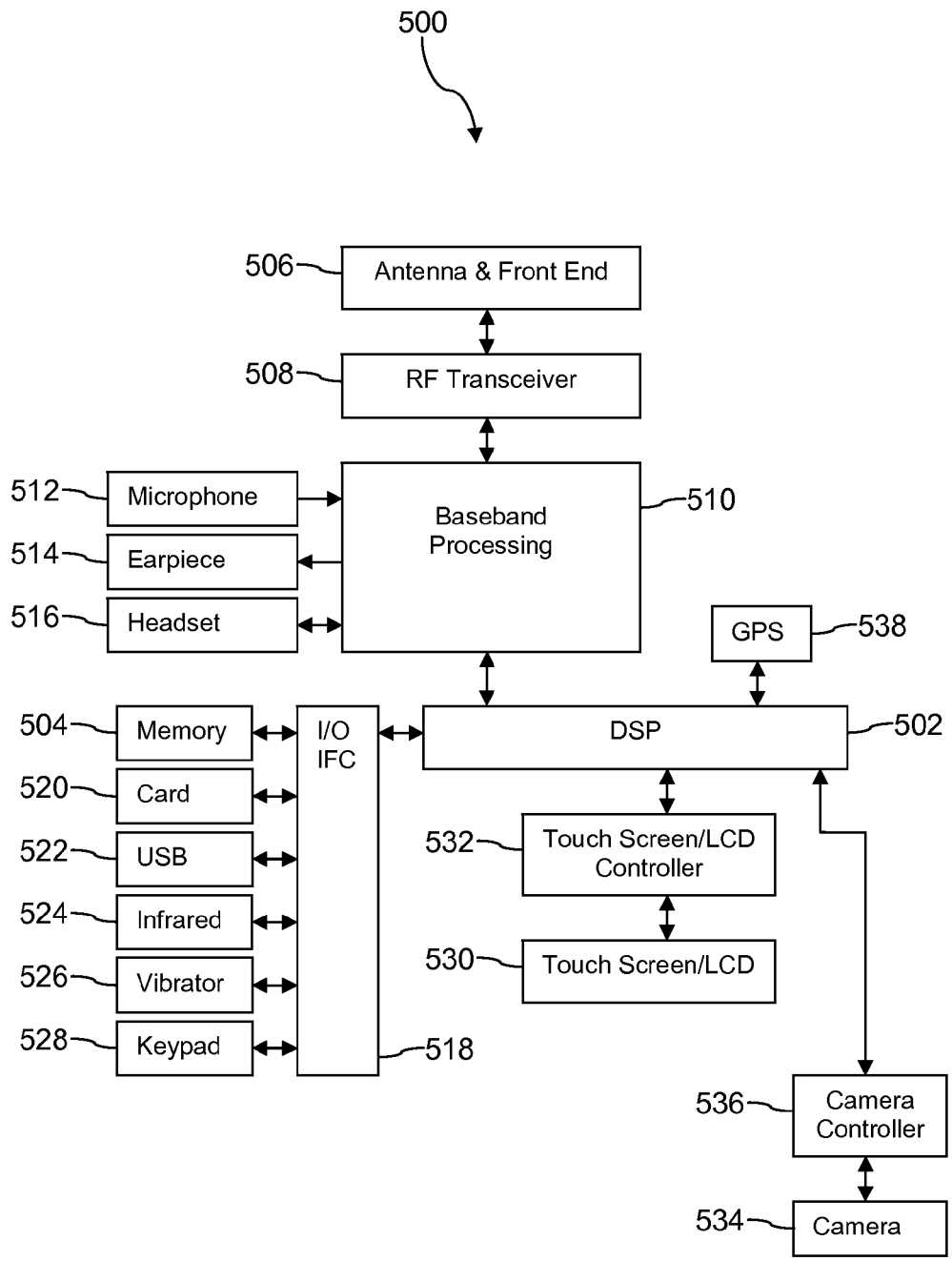
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
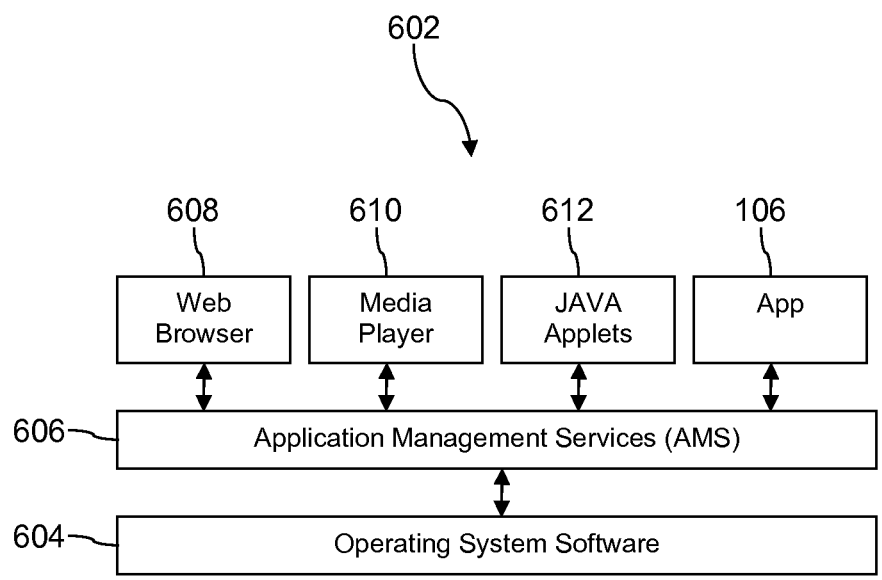
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
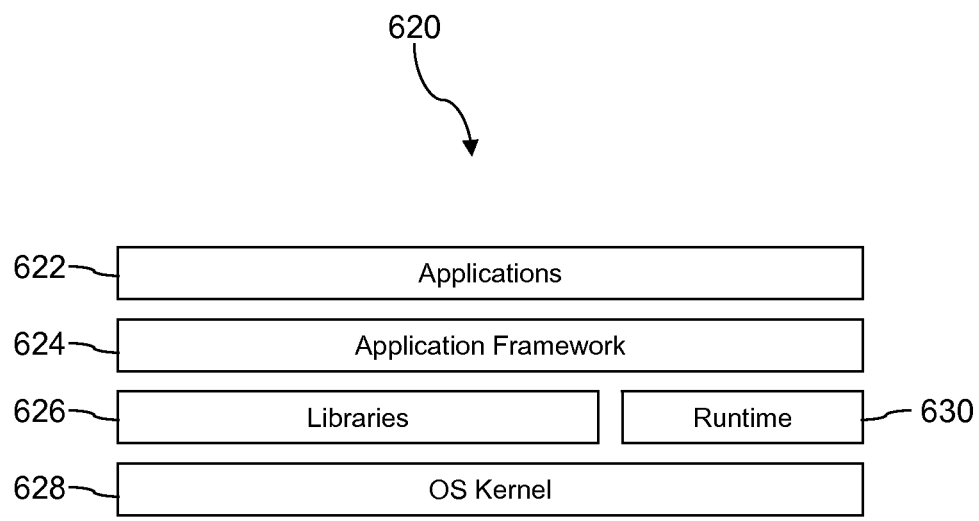
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
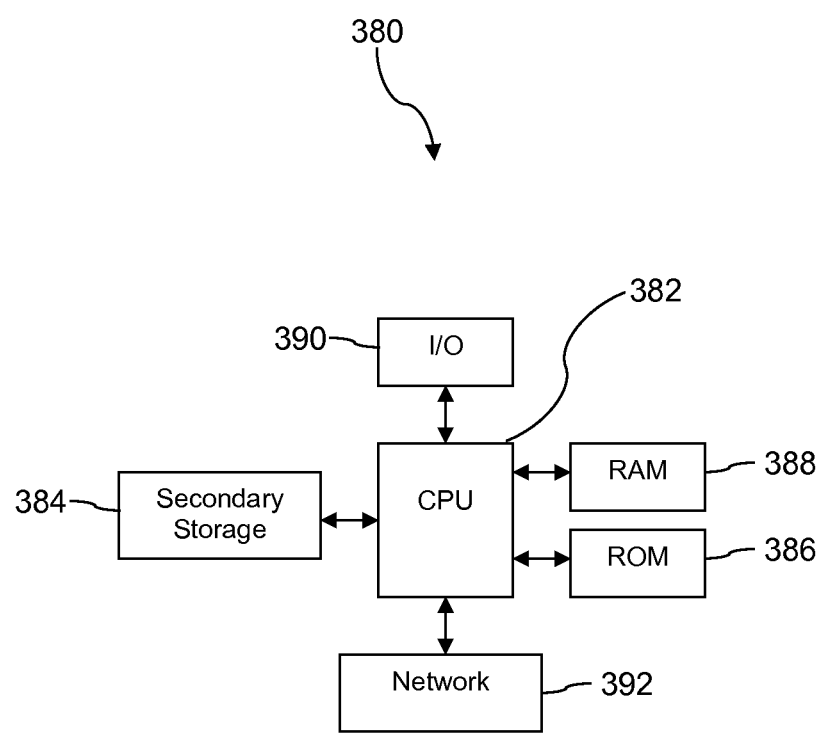
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of configuring a trusted security zone into a portable electronic device, comprising:
    executing instructions on a processor of the portable electronic device that determine the state of a Joint Test Action Group (JTAG) port of the portable electronic device;
    responsive to a determination that the JTAG port is enabled, executing instructions on the processor preventing configuration of the trusted security zone into the portable electronic device;
    responsive to a determination that the JTAG port is disabled, configuring the trusted security zone into the portable electronic device, wherein the trusted security zone provides hardware assisted trust, wherein configuring the trusted security zone comprises installing the trusted security zone in a secure portion of a memory in the portable electronic device; and
    after the trusted security zone is configured into the portable electronic device, executing instructions on the processor creating a JTAG port inspected certificate and storing the JTAG port inspected certificate into a trusted memory area of the trusted security zone,
    wherein executing instructions on the processor preventing configuration of the trusted security zone into the portable electronic device responsive to the determination that the JTAG port is enabled reduces a vulnerability to hacking the trusted security zone via the enabled JTAG port.

2. The method of claim 1, wherein determining the state of the JTAG port comprises determining whether the fuses of the JTAG port are blown.

3. The method of claim 1, wherein determining the state of the JTAG port comprises reading from the JTAG port addresses.

4. The method of claim 1, further comprising, responsive to the determination that the JTAG port is enabled, sending an electronic message to a server computer identifying the portable electronic device and indicating that the JTAG port of the device was determined to be enabled, whereby a purchaser of portable electronic devices accumulates statistical information on the performance of vendors based on the message.

5. The method of claim 1, wherein the portable electronic device is one of a mobile phone, a personal digital assistant (PDA), or a media player.

6. The method of claim 1, wherein the portable electronic device is one of a laptop computer, a tablet computer, or a notebook computer.

7. A method of protecting an electronic device from a hacking attack that exploits a Joint Test Action Group (JTAG) port of the electronic device that has not been disabled, comprising:
    executing instructions on a processor of the electronic device that determine the state of a JTAG port of the electronic device;
    responsive to a determination that the JTAG port is enabled, executing instructions on the processor of the electronic device to detect a physical connection to the JTAG port;
    responsive to detecting a physical connection to the JTAG port, executing instructions on the processor preventing execution of trusted applications;
    responsive to a determination that the JTAG port is enabled, executing instructions on the processor preventing execution of software that reads from the JTAG port; and
    responsive to a determination that the JTAG port is enabled, preventing downloading of at least one of confidential information, financial applications, a credit card number, or a credit card payment application,
    wherein executing instructions on the processor preventing execution of the trusted applications responsive to detecting the physical connection to the JTAG port, executing instructions on the processor preventing execution of the software that reads from the JTAG port responsive to the determination that the JTAG port is enabled, and preventing downloading of at least one of confidential information, financial applications, a credit card number, or a credit card payment application responsive to the determination that the JTAG port is enabled reduces a vulnerability of the electronic device to a hacking attack that exploits the enabled JTAG.

8. The method of claim 7, wherein the electronic device is one of a mobile phone, a laptop computer, a tablet computer, a notebook computer, a server computer, a router, or an embedded system.

9. The method of claim 7, wherein determining the state of the JTAG port comprises reading from addresses associated with the JTAG port.

10. The method of claim 7, wherein determining the state of the JTAG port comprises determining the state of JTAG fuses.

11. The method of claim 10, wherein responsive to a determination that the JTAG fuses are intact, storing a parameter value abstractly indicating that the JTAG port is enabled.

12. The method of claim 10, wherein responsive to a determination that the JTAG fuses are blown, storing a parameter value abstractly indicating that the JTAG port is disabled.

13. The method of claim 7, further comprising sending a message to a server computer indicating that the JTAG port is not disabled.

14. A method of thwarting a hacking attack on a mobile phone via an enabled Joint Test Action Group (JTAG) port of the mobile phone, comprising:

executing instructions on a processor of the mobile phone that detect the state of the JTAG port as one of enabled or disabled;

responsive to a determination that the JTAG port is enabled, taking a first action to reduce vulnerability to hacking attacks via the enabled JTAG port, wherein the first action comprises preventing downloading of at least one of confidential information, financial applications, a credit card number, or a credit card payment application;

responsive to a determination that the JTAG port is disabled, configuring a trusted security zone into the mobile phone, wherein configuring the trusted security zone comprises installing the trusted security zone in a secure portion of a memory in the mobile phone; and after the trusted security zone is configured into the mobile phone, executing instructions on the processor creating a JTAG port inspected certificate and storing the JTAG port inspected certificate into a trusted memory area of the trusted security zone.

15. The method of claim 14, further comprising when the JTAG port is determined to be enabled, marking a hardware portion of the mobile phone intended for installation of a trusted security zone as one of invalid or untrusted.

* * * * *